United States Patent
Hösle

(10) Patent No.: US 6,401,561 B1
(45) Date of Patent: Jun. 11, 2002

(54) BOWL MILL TRANSMISSION

(75) Inventor: Helmut Hösle, Diedorf (DE)

(73) Assignee: Renk Aktiengesellschaft, Augsburg (DE)

( * ) Notice: Subject to any disclaimer, the term of this patent is extended or adjusted under 35 U.S.C. 154(b) by 0 days.

(21) Appl. No.: 09/552,121

(22) Filed: Apr. 19, 2000

(30) Foreign Application Priority Data

Apr. 19, 1999 (DE) .......................... 199 17 609

(51) Int. Cl.[7] .............. F16H 1/20; F16H 57/02; B02C 9/00
(52) U.S. Cl. .................. 74/420; 241/117; 74/606 R
(58) Field of Search ............... 74/420, 606 R; 241/117

(56) References Cited

U.S. PATENT DOCUMENTS

| 121,048 A | 11/1871 | Faught | 74/420 |
|---|---|---|---|
| 4,471,671 A | 9/1984 | Sigg | 475/343 |
| 4,572,442 A | 2/1986 | Sigg | 241/117 |
| 4,887,489 A | 12/1989 | Sigg | 475/343 |
| 5,616,098 A | 4/1997 | Katayama et al. | 475/346 |

FOREIGN PATENT DOCUMENTS

DE 32 26 816 1/1984

OTHER PUBLICATIONS

Article entitled "Kegelrad–Planetengetriebe KPAV für vertikale Wälzmühlen" appearing in Renk Tacke dated Dec. 16, 1999. 8 pages.

Article apearing in Zement–Kalk–Gips, dated 1981, 3 pages.

*Primary Examiner*—Allan D. Herrmann
(74) *Attorney, Agent, or Firm*—Cohen, Pontani, Lieberman & Pavane

(57) ABSTRACT

A bowl mill transmission which has a high overall transmission ratio with a large output torque, is of compact construction and is simple to assemble. The transmission being a vertically arranged bevel-gear stage for power input and a multi-stage transmission arrangement for power output into a thrust plate of the bowl mill crusher.

16 Claims, 2 Drawing Sheets

BOWL MILL TRANSMISSION

BACKGROUND OF THE INVENTION

1. Field of the Invention

The present invention relates to bowl mill transmissions, and particularly to a bowl mill transmission with a vertically arranged bevel-gear stage for power input and a multi-stage transmission arrangement for power input to a thrust plate of a bowl-mill crusher.

2. Description of the Related Art

The invention is based on bowl mills which are driven by vertical bevel-gear transmissions.

The prior art includes drives of this kind (e.g., Renk Tacke company publication Kegelrad-Planetengetriebe KPAV für vertikale Walzmüu hlen [Epicyclic bevel-gear transmissions for vertical roller mills]) in which the bevel-ear stage outputs power into the sun gear of an epicyclic transmission with a fixed annulus. In such transmissions, power output to the grinding bowl is via the planet carrier, which accommodates a plurality of planet gears for power transmission.

The grinding process in such mills requires high power transmission to the grinding stock at low speeds of rotation and high torque. The high transmission ratios required for this purpose are limited by the maximum possible diameter of the transmission stage and the diameter of the horizontal bevel gear. The diameter of the epicyclic stage is limited by the transmission housing which passes the grinding forces into the mill foundation by direct force transmission.

Developments of such drives embody two epicyclic stages. Here, the bevel-gear transmission drives a first sun pinion of a first epicyclic transmission stage. A second epicyclic transmission stage is driven by means of a rotationally fixed connection of the planet carrier, which rotates in the fixed annulus, to a further sun gear, which is arranged axially above the first sun gear. This second epicyclic stage is arranged axially above and concentrically to the first. By way of a further planet carrier, which revolves in a further fixed annulus by means of its planet gears, which are provided for power splitting, it outputs power into the grinding bowl.

The prior-art transmissions consume high input power to move the large revolving masses. A considerable outlay for bearings is furthermore required and assembly of the many individual parts is difficult. Furthermore, the bearings installed in revolving planet carriers can be monitored only with extreme difficulty.

SUMMARY OF THE INVENTION

It is accordingly an object of the present invention to provide a transmission which has a high overall transmission ratio with a large output torque, is of compact construction, and is simple to assemble.

According to an aspect of the invention, this object is achieved by a bowl mill transmission having a bevel-gear stage that inputs power via a pinion of a first transmission stage into a gear arranged on a gear shaft. A further gear axially displaced along the gear shaft outputs power into an annulus of a further transmission stage which is rotationally fixed to the output thrust plate.

In each of its various overall sizes, the transmission design according to the invention covers a broader power range than the prior art and extends the power spectrum upwards.

By virtue of the compact stage unit according to the invention, the transmission can to a very large extent be preassembled, making assembly easier.

By virtue of the advantageous nonrevolving arrangement, fixed relative to the housing, of the gears, their bearing arrangements in transmissions according to the invention are simple to lubricate and monitor. Moreover, the toothings can be provided with splash lubrication.

By virtue of the advantageous simple tooth engagement of the gears, there is no alternating bending stress on the tooth roots, and the teeth thus have higher tooth-root bearing capacities or can be made with smaller dimensions.

While maintaining grinding performance, more compact plants with a significantly lower weight can be achieved with the transmission arrangement according to the invention.

By virtue of the advantageous drive configuration, the transmission according to the invention can be constructed on a modular basis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PREFERRED EMBODIMENTS

Figure 1:
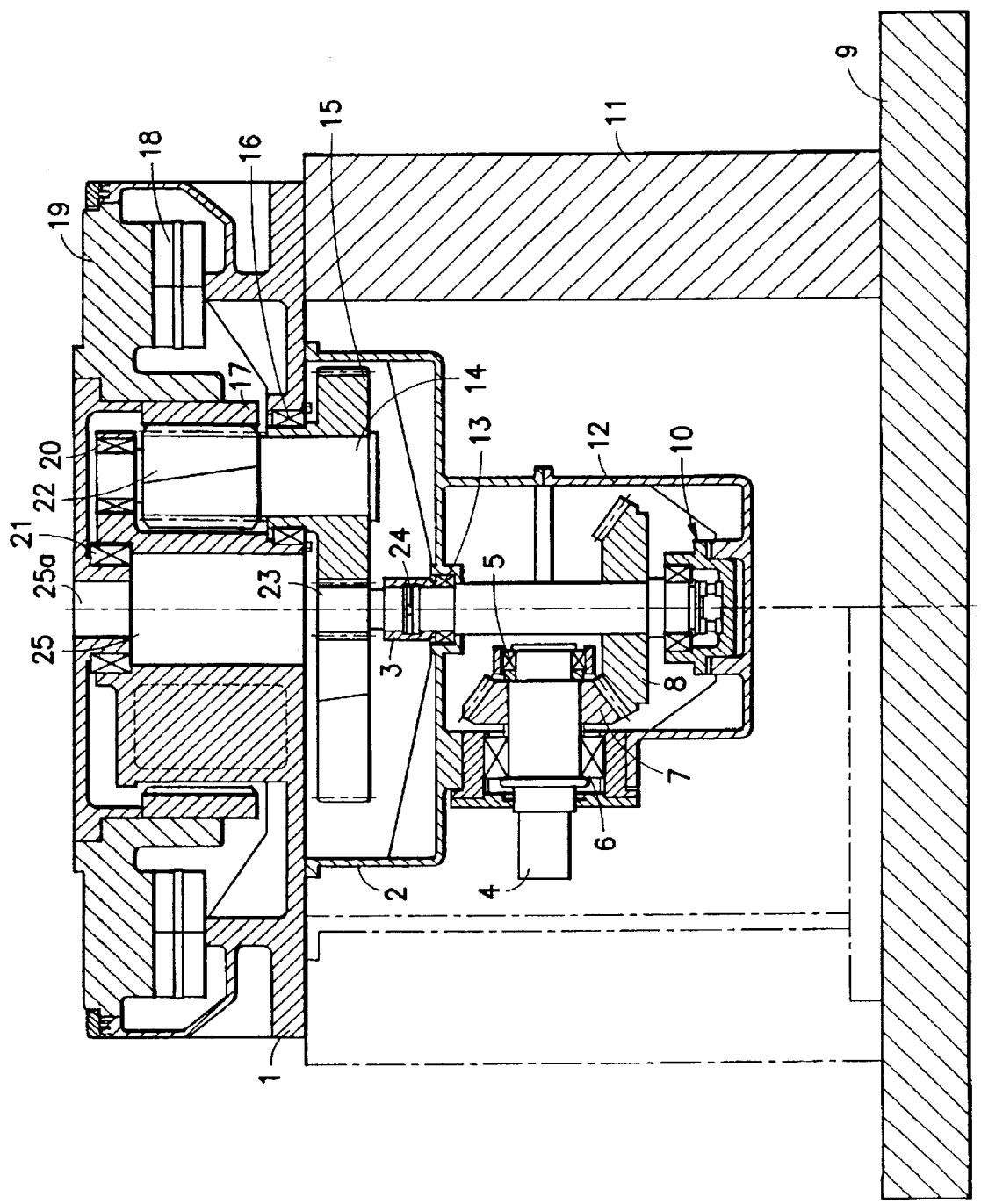
FIG. 1 shows a longitudinal section through a transmission according to the invention.

FIG. 1 shows a longitudinal section through a transmission according to the invention. The bottom part 11 of the housing of the transmission stands on the foundation 9. Power input is by means of the drive shaft 4, which is connected at one end to a source of motive power (an electric motor, for example), and carries a bevel gear 7 at its other end. The drive motor has not been shown here. On the drive side, the drive shaft 4 is guided in a bearing 6, which is fitted into a bottom part 12 of the flanged housing 2 by means of a cartridge. A second bearing 5 is provided within the flanged housing 2 at the other end of the shaft in order to support the bevel gear 7 arranged in between. By means of tooth engagement with the horizontal bevel gear 8, the driving power is transmitted to the vertical shaft of the angular transmission. To support the axial and radial forces resulting from the tooth engagement, the vertical shaft of the bevel gear 8 is guided at its lower end by a bearing unit 10, which is secured in the bottom part 12 of the flanged housing. A further bearing 13 is arranged at the other end of the shaft so that the shaft projects somewhat and is connected in a rotationally fixed manner to the shaft of the pinion 23 by a releasable coupling 3. This coupling 3 is preferably a toothed coupling which is situated in that part of the flanged housing 2 which surrounds the first transmission stage. The pinion 23 is supported axially on the vertical shaft of the bevel-gear transmission and is guided in the radial direction in an overhung manner between the gears 15. The gears 15 are connected in a rotationally fixed manner to gear shafts 14 which are supported in the top part 1 of the housing in the bearings 16 and 20. The gears 22 are arranged on the gear shafts 14 between the bearings 16 and 20 and input power into the revolving annulus 17. The annulus 17 is connected directly to the thrust plate 19, frictionally by means of a press fit and additionally in a form-fitting manner by means of keys. However, a rotationally fixed connection between the thrust plate 19 and the annulus 17 can also be established in some other way. Because the gear shafts 14 are supported directly in the top part 1 of the housing, the resulting supporting torque can be introduced directly into the foundation 9 via the housing. The planet carrier of these gear shafts 14 forms an integral component of the top part 1 of the housing—as do the thrust bearings 18.

The actual grinding plate, which is well known and has therefore not been included in the drawings, is mounted on the thrust plate 19. The very large grinding forces which act in the axial direction on the thrust plate 19 are introduced by means of the thrust bearings 18 into the top part 1 of the housing, from where they are introduced into the foundation by direct force transmission via the cylindrical bottom part 11 of the housing.

The bottom part 11 of the housing can be dispensed with completely if the foundation 9 is provided with a recess in which the flanged housing 2, 12 and the drive are accommodated. In such embodiments, the force is transmitted directly into the foundation, this being advantageous in terms of vibration.

The thrust bearings 18 are embodied as hydrodynamic or hydrostatic bearings or as a combination of the two types of bearing, depending on the size of the mill and the grinding pressure which arises.

Without additional outlay it is possible for the gears of the transmission stages 23, 15, 22, 17 to be given helical toothing and for the associated higher bearing capacity of the toothing to be exploited. In such embodiments, the thrust bearings 18 can be relieved of load by the thrust resulting from the toothing. The thrust of the first and second transmission stages 23, 15, 22, 17 can cancel each other out, and axial forces of the pinion 23 can be introduced into the bearing unit 10 via the vertical bevel-gear shaft. In another embodiment, the shaft of the pinion 23 can be provided with a flexible support on the vertical bevel-gear shaft to compensate for or mitigate torque fluctuations in the drive train, as a result of which—given a rotational fixed connection—the shaft of the sun pinion 23 can move axially to a limited extent relative to the vertical bevel-gear shaft, which is supported axially in a fixed manner.

It is furthermore possible to obtain information on the current operating data of the plant, such as torque, power etc., by measuring the axial forces arising in the shaft of the pinion 23. With a knowledge of these data, it is then possible to intervene in an appropriate manner in the operating sequence by control or regulation—e.g., switching off in the event of overload and the risk of destruction of the transmission. For this purpose, a sensor 24 is mounted between the shaft of the pinion 23—the said shaft being capable of axial elastic movement—and the shaft of the horizontal bevel gear 8—the shaft being supported in a vertically fixed manner—to record the force with which the pinion shaft 23, which is seated in a manner which allows axially elastic movement, presses on the shaft of the horizontal bevel gear 8. A suitable sensor 24 for this purpose is, for example, a load cell (based on piezoelectric, inductive or similar principles) or a displacement sensor which records the relative movements between the shaft of the pinion 23 and the shaft of the horizontal bevel gear 8 and, via the spring constant of the elastic connecting member, provides indirect information on the force arising. For transmission of the measurement signals, the shaft of the horizontal bevel gear 8 is bored out and accommodates measurement lines and transmission elements for the signals.

Figure 2:
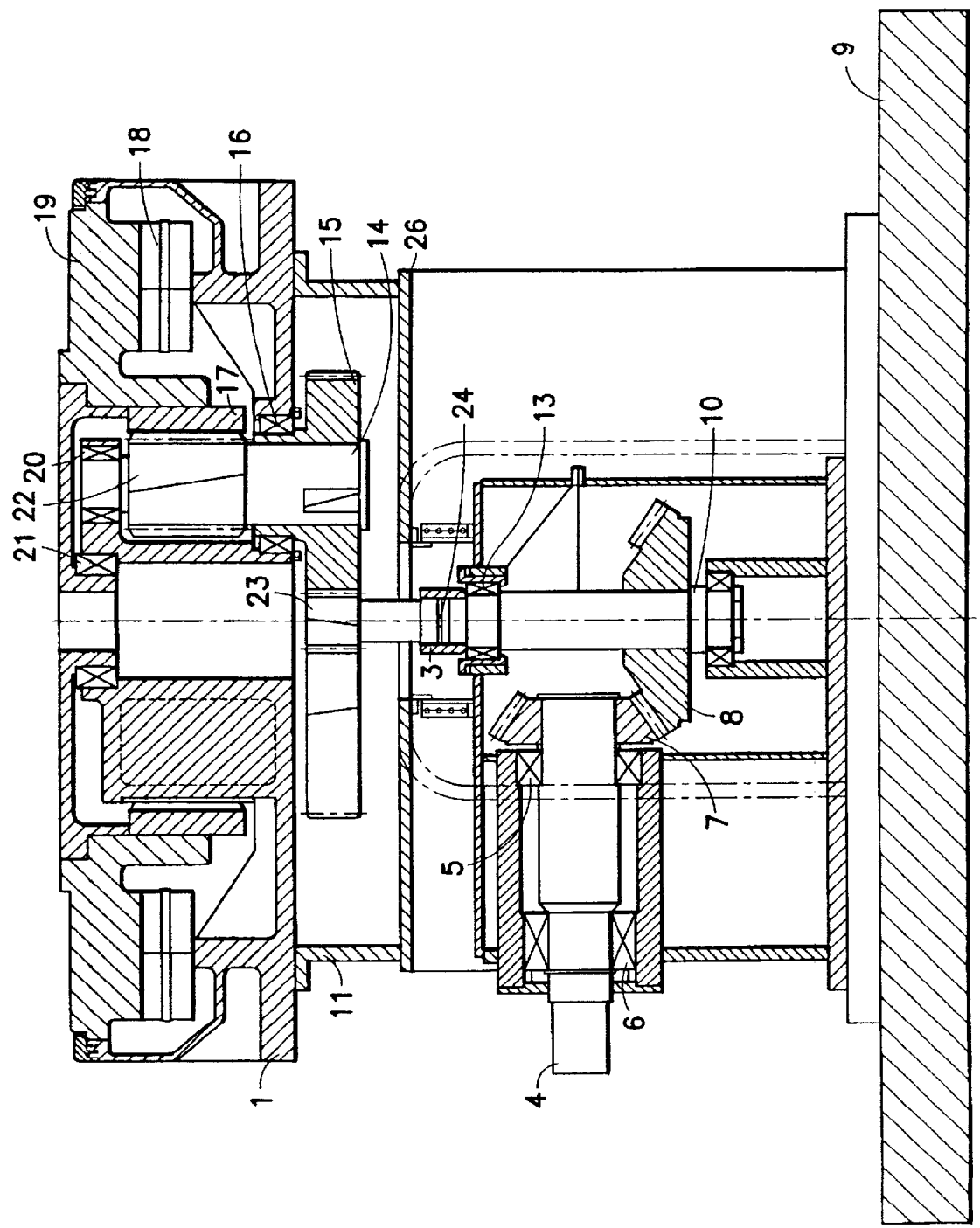
FIG. 2 shows a view similar to FIG. 1 of another embodiment.

In another embodiment shown in FIG. 2, the flanged housing 2 with the bottom part 12 is replaced by a vertical housing, secured on the foundation, for the bevel-gear transmission. A complete module of this kind can be inserted through a tunnel 26 leading radially into the bottom part 11 of the housing and can be positioned under the raised pinion 23. By lowering of the shaft with the pinion 23, which, as with the process of raising, is performed via central openings 25, 25a in the top part 1 of the housing and in other cover plates by means of lifting gear, the gear shaft is connected to the bevel-gear shaft by a coupling 3.

All embodiments of the housing allow partial disassembly of their components after installation.

All rotary parts rotate only about their own axes, which means that bearing arrangements are simple to lubricate and monitor. Splash lubrication can be provided for the toothings of both transmission stages 23, 15, 22, 17.

Thus, while there have been shown and described and pointed out fundamental novel features of the invention as applied to a preferred embodiment thereof, it will be understood that various omissions and substitutions and changes in the form and details of the devices illustrated, and in their operation, maybe made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A bowl mill transmission, comprising: a thrust plate; a housing having a top part; a vertically arranged bevel-gear stage for power input; and a multi-stage transmission arrangement for power output into the thrust plate, the multi-stage transmission arrangement including a first transmission stage having a pinion, and a gear arranged on a gear shaft supported rotatably in the top part of the housing, the bevel-gear stage being arranged to input power via the pinion into the gear, the transmission arrangement further including a second transmission stage having an annulus rotationally fixed to the thrust plate and a further gear arranged in an axially offset position on the gear shaft so as to output power into the annulus.

2. A bowl mill transmission according to claim 1, wherein the bevel-gear stage is couplable to and decouplable from the transmission arrangement as a complete unit without removing the transmission arrangement.

3. A bowl mill transmission according to claim 2, wherein the bevel gear stage includes a bevel gear with a vertical shaft, and further comprising a rotationally fixed connection between the pinion and the vertical shaft of the bevel gear, the rotationally fixed connection being releasable.

4. A bowl mill transmission according to claim 3, wherein the rotationally fixed connection between the pinion and the vertical shaft of the bevel gear is a toothed coupling.

5. A bowl mill transmission according to claim 2, wherein the housing has a bottom part with a tunnel, the complete bevel-gear stage being configured so as to be insertable as a unit laterally into the tunnel in the bottom part of the housing.

6. A bowl mill transmission according to claim 2, and further comprising a flanged housing flanged to the top part of the housing, the bevel-gear stage being arranged in the flanged housing.

7. A bowl mill transmission according to claim 6, wherein the flanged housing has a plurality of parts so as to be partially disassemblable.

8. A bowl mill transmission according to claim 1, wherein the thrust plate and the top part of the housing have openings to provide access to the pinion.

9. A bowl mill transmission according to claim 1, wherein the annulus is press fit in a rotationally fixed manner by frictional engagement to the thrust plate.

10. A bowl mill transmission according to claim 9, wherein the annulus is connected in a rotationally fixed manner to the thrust plate by a form-fitting engagement in addition to the press fit.

11. The bowl mill transmission according to claim 1, wherein the thrust plate is guided radially by a radial bearing.

12. A bowl mill transmission according to claim 1, and further comprising a carrier of the gear and the further gear and thrust bearings integrated into the top part of the housing.

13. A bowl mill transmission according to claim 1, wherein the transmission arrangement is helically toothed.

14. A bowl mill transmission according to claim 1, wherein the pinion is connected in a manner which allows axial movement.

15. A bowl transmission according to claim 1, and further comprising a sensor operatively arranged to record axial force of a shaft of the pinion.

16. A bowl mill transmission according to claim 14, and further comprising a sensor operatively arranged to record axial force of a shaft of the pinion.

* * * * *